Aug. 27, 1929.  S. M. HERSHBERG  1,726,350
FOCUSING MECHANISM
Filed June 10, 1926
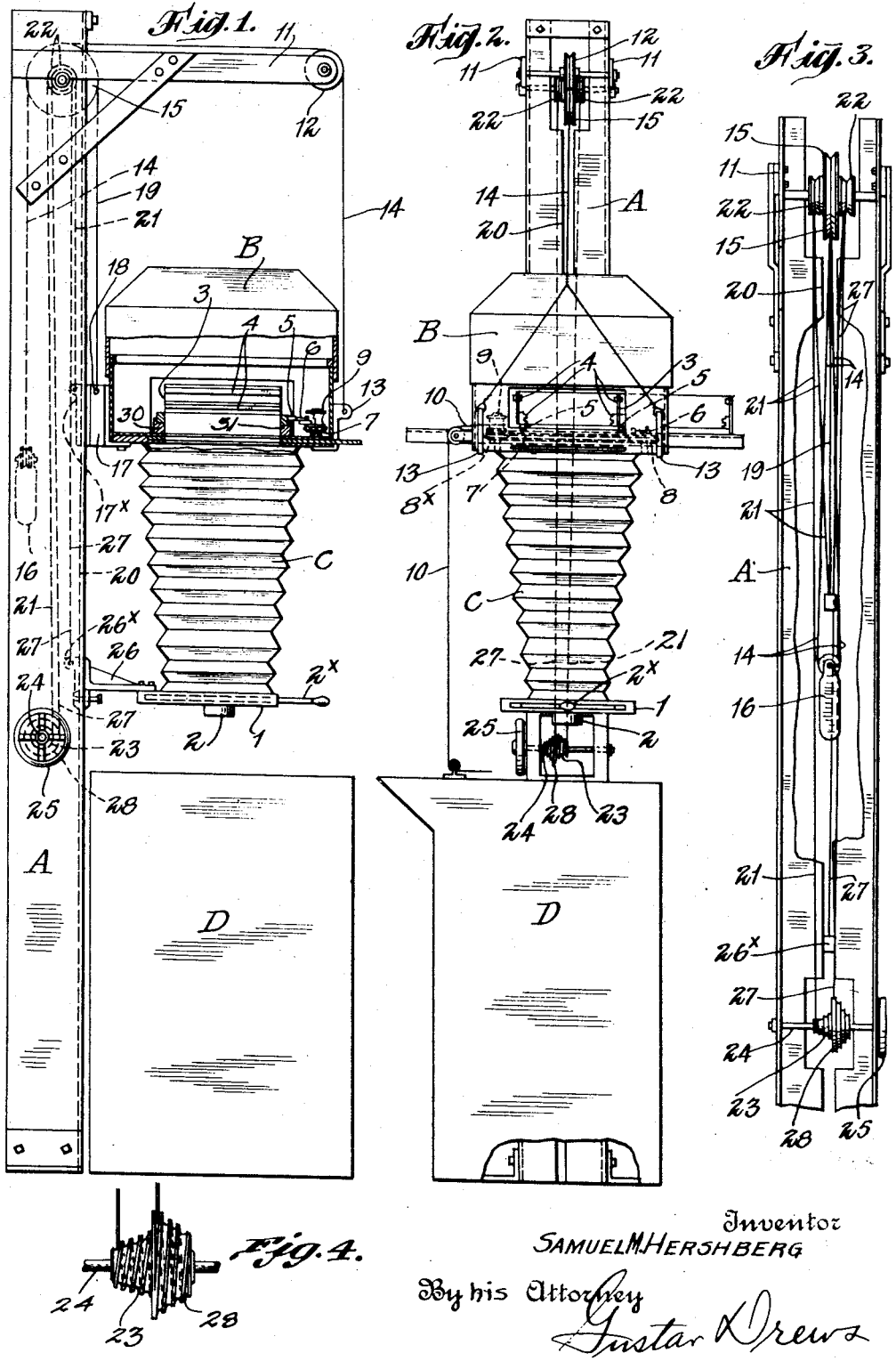
Inventor
SAMUEL M. HERSHBERG
By his Attorney
Gustav Drews Patented Aug. 27, 1929.

1,726,350

UNITED STATES PATENT OFFICE.

SAMUEL M. HERSHBERG, OF BROOKLYN, NEW YORK.

FOCUSING MECHANISM.

Application filed June 10, 1926. Serial No. 114,928.

The object of the present invention is to provide a camera adapted for photographic reproduction work, the invention having particular relation to means for focusing the camera, the latter being of that type in which the camera box supports a negative holder below a lamp for projection of the image upon a sensitized sheet supported below the lens. Further objects of the invention will hereinafter appear.

The invention will be understood by reference to the accompanying drawing, in which—

Figure 1 is a side elevation of an embodiment of the invention, the camera casing being shown in section, and Figure 2 is a front elevation of the same;

Figure 3 is a rear elevation, in section, of the camera supporting unit and certain elements of the focusing means.

Figure 4 is an enlarged detailed view of the control mechanism.

The embodiment of the invention illustrated in the drawing comprises a camera supporting unit A, a camera casing B, depending from which is a bellows C. The bellows is provided with a lens frame 1 carrying the lens housing 2, the frame also supporting a member $2^x$ for adjusting the size and placing of the lens opening.

The camera casing B may be provided with any suitable means for supporting the negative, and the negative may be on a plate or a film. In the present instance a train of negative holders are adapted to be successively moved through the casing for successive projection of their images upon sensitized paper or the like, supported by member D. The casing B, see Fig. 1 is provided with supporting rails 30 and 31 on opposite sides of the light passage to receive the negative holder 3. As shown in Figure 2, the negative holder 3 is provided with a plurality of racks 4, which racks are adapted to receive a negative and also vignettes or the like. In order to move a negative holder out of position and bring a succeeding negative holder into position, I provide each holder with one or more projecting studs 5, which studs are adapted to be engaged by a pawl 6 on an endless chain or belt 7. The chain passes over pulleys, 8, $8^x$ and the latter pulley has connected thereto a drum 9 upon which is wound a cable 10. When the cable is drawn downwardly the drum and pulley $8^x$ will be rotated to impart a movement to the chain or belt, pawl 6 engaging stud 5 and moving the negative holder bodily to the right. The succeeding negative holder will partake of this movement inasmuch as the holders are connected together by any suitable means. Pawl 5 will be so arranged that when cable 10 is released the pawl will slip past the stud of the rearwardly disposed negative holder and lie in position to advance that holder when a further operative movement is given cable 10. When cable 10 is released a spring connected to drum 9 will return the drum to initial position and carry the pawl back to a new operative position, as described.

The supporting unit A in the embodiment shown, is a rectangular vertically disposed member. At its top it carries a bracket 11, a pulley 12 being rotatably supported at the front end of the bracket. Connected to the camera casing at 13 is a cable 14 which is led over pulley 12 and thence extends over a large pulley 15, thence passing downwardly and being connected to a counterweight 16. At the rear of the camera casing is a guide bracket 17. Connected to the bracket at 18 is a cable 19 which passes over drum 15 and likewise is connected to counterweight 16. Bracket 17 is formed with a rearwardly projecting lug $17^x$ which projects through a guide slot 20 formed in supporting unit A so that the casing, in its vertical movements, is guided in a straight line. Lug $17^x$ has connected thereto a cable 21 which passes over one of two small pulleys 22 and thence extends downwardly and is connected with a spiral drum 23. Drum 23 is fixed upon a shaft 24 and a hand wheel 25 is employed to rotate the shaft.

Fixed upon the lens frame 1 is a bracket 26, the bracket having a rearwardly projecting lug $26^x$ which passes into guide slot 20. Lug $26^x$ has connected thereto a cable 27 which passes upwardly over one of the two small pulleys 22 and thence extends downwardly, being connected to large spiral drum 28. The pitch of the spirals 23 and 28 relative to one another will of course depend upon the type of lens used and the distance of travel of the negative holder and lens holder relative to the sensitized paper. With a given lens and given distances of travel, the difference in pitch of the two spirals can be readily obtained, it being of course understood that the length of two circles varies directly as their diameter.

When the camera casing is in its maximum upper position, cable 19 will lie upon the larger spiral of drum 23, whereas the lens adjusting cable 27 will lie upon the point of smaller diameter on the spiral drum 28. Therefore, when hand wheel 25 is rotated to cause the camera casing and lens to descend, the lens will be caused to descend with gradually increasing speed, whereas the camera casing will descend with gradually decreasing speed until a point is reached wherein the movement of the lens is rapid and the movement of the camera casing is very slow. This arrangement enables ready fine focusing of the lens by rotation of hand wheel 25 without materially affecting the position of the camera casing.

I prefer that the camera adjusting cable 21 be shorter than the lens adjusting cable 27 so that in reducing work when the lens has been lowered to the maximum position continued rotation of hand lever 25 will wind in the camera adjusting cable 21 and thus reverse the movement of the camera casing, carrying it upwardly to further expand the bellows in which case the lowest position of the lens holder would accord with a given reduction when the negative holder would be raised to a predetermined position, or the position of the lens holder be adjusted independent of the spiral 28.

It will be understood that in the drawings I have illustrated a preferred embodiment of the invention, but that the same may be substantially modified without departing from the spirit of the invention, what I claim and desire to secure by Letters Patent being as follows:—

1. A camera comprising a casing provided with negative holding means, a lens holder, and a bellows connecting the negative holding means with the lens holder, in combination with means for simultaneously adjusting the position of the negative holding means and correspondingly adjusting the position of the lens holder, said means comprising a rotary drum operatively connected to the negative holding means and a rotary drum operatively connected to the lens holder, said drums having means for simultaneous rotation and different spirals imparting different degrees of movement.

2. In a camera, a camera casing provided with means for supporting a negative holder, a lens holder, a bellows for connecting the camera casing to the lens holder, and means for simultaneously adjusting the position of the camera and the lens holder, which comprises a shaft, drums on the shaft of different diameters, and flexible connections, one flexible connection connecting one of the drums with the camera casing and another flexible connection connecting the other drum with the lens holder.

3. In a camera, a camera casing adapted to support a negative holder, a lens support, a bellows connecting the negative holder with the lens support, and means for simultaneously adjusting the position of the casing and the lens support which comprises a drum having a cable connection with the casing, a larger drum having a cable connection with the lens support, a shaft upon which said drums are fixed, and means for rotating said shaft.

4. In a camera, a casing adapted to receive a train of negative holders, a lens support, a bellows connecting the casing with the lens support, a camera supporting unit having a plurality of guide pulleys at its top, a cable connected to the camera casing and leading over a guide pulley and thence extending to a drum, a second cable connected to the lens support and thence leading over to a guide pulley and extending to a drum of larger size, a third cable connected to the camera casing and leading over a guide pulley and thence extending to a counter-balance, and means for rotating said drums whereby the position of the camera may be adjusted simultaneously with a corresponding adjustment of the lens support.

5. A camera comprising a casing provided with a negative holding means, a lens holder, and a bellows connecting the negative holding means with the lens holder, in combination with a supporting unit for slidably supporting said negative holding means and said lens holder, a rotatable member having two differently pitched spirals, a cable connecting one spiral with said negative holding means, and a second cable connecting the other spiral with said lens holder, said rotatable member being actuatable simultaneously to adjust the position of said negative holding means and lens holder relative to said supporting unit.

6. A camera comprising a casing provided with a negative holding means, a lens holder, and a bellows connecting the negative holding means with the lens holder, in combination with a vertically extending supporting unit for slidably supporting said negative holding means and said lens holder, idlers disposed at the upper end of said supporting unit, a rotatable member having two differently pitched spirals disposed below said idlers, a cable connecting one spiral with said negative holding means and passing from said negative holding means to and over one of said idlers down to said spiral, and a second cable connecting the other spiral with said lens holder and passing from said lens holder to and over the other of said idlers down to said other spiral, said rotatable member being actuatable simultaneously to adjust the position of said negative holding means and lens holder relative to said supporting unit.

SAMUEL M. HERSHBERG.